Dec. 5, 1961 G. E. SCHMITKONS ET AL 3,011,967
PLATINUM CATALYST HYDROFORMING AND REACTIVATION TECHNIQUE
Filed Nov. 24, 1959
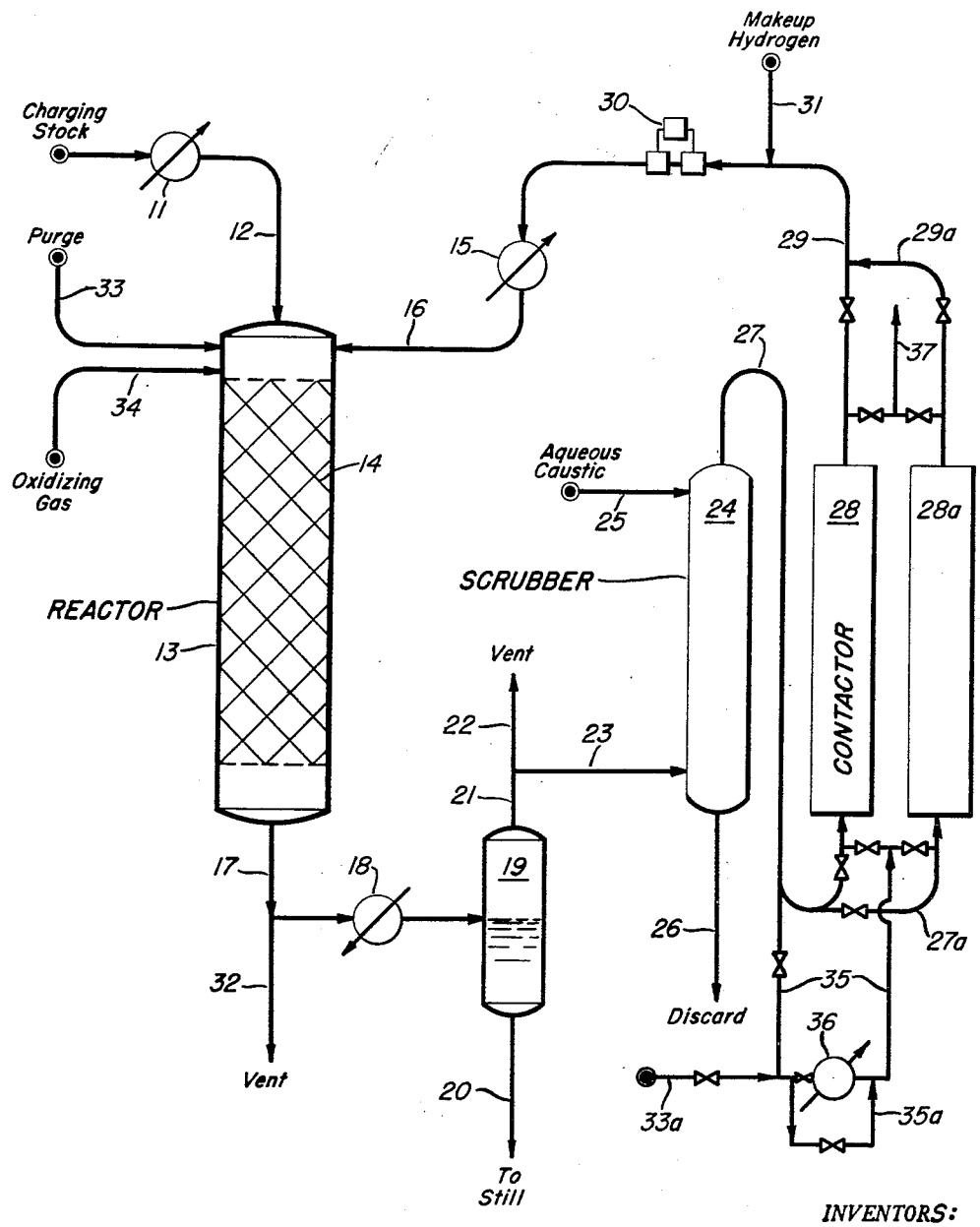
INVENTORS:
George E. Schmitkons
Stanley E. Shields
BY
ATTORNEY

United States Patent Office 3,011,967
Patented Dec. 5, 1961

3,011,967
PLATINUM CATALYST HYDROFORMING AND REACTIVATION TECHNIQUE
George E. Schmitkons, Flossmoor, Ill., and Stanley E. Shields, Whiting, Ind., assignors to Standard Oil Company, Chicago, Ill., a corporation of Indiana
Filed Nov. 24, 1959, Ser. No. 855,187
6 Claims. (Cl. 208—139)

This invention relates to the reforming of hydrocarbons and particularly to the hydroforming of hydrocarbons in the presence of catalysts of the noble-metal type. More specifically, our invention relates to the reactivation of platinum-containing catalysts after deactivation and carbonization thereof in the hydroforming of hydrocarbons.

The so-called "hydroforming" process, in its original form, employed a molybdenum-alumina catalyst under conditions of elevated temperature and pressure for the reforming of hydrocarbons in the presence of hydrogen, and produced results that were greatly superior to the prior-art processes in terms of product quality. The yield-octane relationship, however, left something to be desired, and the catalyst became carbonized and deactivated very rapidly, so that frequent regeneration was necessary. These shortcomings of the process have been remedied to some extent by the recent development of platinum-type alumina-supported hydroforming catalysts. The new catalysts are capable of producing a substantially improved yield-octane relationship, and some of them are capable of producing substantially continuous operation for extended periods of time, when operated with carefully chosen charging stocks and rigidly controlled conditions of temperature, pressure, and space velocity. Among the catalysts of the new type are the halogen-containing platinum-alumina of Vladimir Haensel, described in U.S. Patent 2,479,109 (August 16, 1949) and the silica-alumina supported platinum and palladium catalysts of Frank G. Ciapetta, described in U. S. Patent 2,550,531 (April 24, 1951). All of the various catalysts, however, ultimately become deactivated by one mechanism or another, presumably by degradation, masking, or poisoning of the active centers, and we have observed that they cannot be satisfactorily restored to their initial activity or activity-maintenance by any of the techniques commonly employed for the revivification of hydroforming catalysts in general or of platinum catalysts in particular.

Another disadvantage of platinum-type catalysts lies in their unfortunate behavior pattern with respect to yield, selectivity, and carbonizing tendency over a range of pressures. At high reactor pressures in the range of about 500 to 750 pounds per square inch (hydrogen partial pressures above about 350 pounds per square inch), these catalysts have satisfactorily long lives if the hydroformer feed stock is carefully selected; however, at a given octane level the yield of reformate is low compared to the yield obtainable at reactor pressures around 200 pounds per square inch. At the lower pressures, on the other hand, platinum-type catalysts maintain their superior activity and selectivity for only relatively short periods; consequently, at such pressures a regenerative process must be used. It appears that for the most advantageous utilization of platinum-type catalysts, a low-pressure hydroforming process should be used, coupled with an adequate method for reactivating the exhausted catalyst.

According to the prior art, platinum hydroforming catalysts may be regenerated by oxidation of the carbon therefrom at an elevated temperature not exceeding 1200° F., followed by hydrogen treatment of the carbon-depleted catalyst. The prior art more specifically teaches that an exhausted platinum-type hydroforming catalyst may be reactivated by treatment with dilute oxygen at 900–950° F., temperatures in excess of 1000° F. being alleged to impair the catalyst activity. These techniques, we have now shown, are ineffective as a practical matter for maintaining both selectivity and activity for long periods of time, i.e., for weeks or months, particularly when the spent catalysts are carbonized. We have conducted an extensive study of the oxidative regeneration of platinum-type hydroforming catalysts, and have found that the oxygen-treatment of a typical carbonized platinum catalyst containing in excess of 0.1 percent by weight of carbon at temperatures above 900° F. soon results in the serious impairment or total destruction of its hydroforming activity. It appears therefore that the prior art does not define a practicable operative method for the regeneration of such catalysts, and that the prior-art workers did not determine or recognize the critical conditions necessary for carrying out the desired regeneration for a long, useful catalyst life.

We have now discovered a new technique whereby platinum-alumina hydroforming catalysts, and the various modifications thereof, can be successfully restored substantially to their initial level of activity, selectivity, and quality-maintenance after being deactivated during exposure to hydrocarbon charging stocks under hydroforming conditions. We have found that such catalysts, containing carbon in excess of 0.1 percent by weight, can be reactivated by oxidation only at a temperature above about 750° F. but not greatly higher than the recrystallization temperature (around 860° F.) of the platinum; at higher temperatures, their catalytic activity is seriously impaired or destroyed. Our invention broadly comprises the steps of subjecting a deactivated platinum catalyst containing above 0.1 percent by weight of carbon to a mild oxidation with a dilute oxygen stream at a temperature above about 750° F. and below 900° F. to remove oxidizable carbon therefrom without destroying the active catalyst centers, and thereafter subjecting the catalyst to contact with a hydrogen-containing gas at a temperature within the hydroforming range. The catalyst is thereby restored to substantially its initial activity and selectivity and to approaching its initial capacity for maintaining its activity and selectivity during further contact with the charging stock.

We have further discovered that water is generated in a recycle hydrogen stream in a regenerative platinum catalyst hydroforming system and the present invention involves the concept of employing a dry on-stream system with drying tower means in the hydrogen recycle stream. Thus we have provided a system which minimizes the problem of gradual decline in catalyst activity, selectivity and other properties during a large number of on-stream regeneration cycles.

In accordance with this invention, the problems presented in the development of a commercial regenerative platinum catalyst naphtha hydroforming system have been appreciated, and a regenerative alumina-supported platinum catalyst is provided wherein water is removed from a recycle hydrogen stream, such water including that produced in the system of reduction of oxides formed in oxidative regeneration or burn-off. Accordingly, the invention comprises in a low-pressure regenerative hydroforming process for treating a petroleum naphtha over an alumina-supported platinum catalyst which is maintained at a high level of activity over a series of hydroforming and regenerating cycles the unique combination of steps including the following features:

(1) Carbon burn-off from catalyst under defined mild conditions;

(2) Further oxidative treatment of the catalyst under more severe conditions of oxygen concentration, which may include high oxygen partial pressures; and (3) Treatment of recycle hydrogen gas during the on-stream cycle to remove water and other impurities, including water formed by reduction of oxides produced in the oxidative treatments.

The small proportions of impurities including water generated in the process are removed by contacting with alumina or molecular sieves so that the recycle hydrogen is substantially free of significant impurities.

We have further discovered that platinum hydroforming catalysts, after being reactivated under the conditions of our process set forth hereinabove, are less sensitive to oxidation at higher temperatures, and can in fact be substantially improved by a further oxidative treatment under more severe conditions of oxygen concentration, contact time, and/or temperature. In this supplemental oxidative treatment, we believe that substantially all of the residual oxidizable carbon is removed, and we find that the progressive loss in activity of the catalyst usually observed with each succeeding cycle is minimized. For the supplemental oxidation, higher temperatures up to about 925° F. are satisfactory.

We have further succeeded in minimizing the deactivation and carbonization of platinum catalysts when utilized in a hydroforming process employing gas recycle, and is materially improving the reactivation of such catalysts according to the method of our invention, by treating the recycle gas (which is predominantly hydrogen) to remove olefins, sulfur compounds, carbon oxides, water, and other impurities therefrom, thereby permitting the recycle of substantially pure or purified hydrogen.

We have further improved the reactivation of platinum catalysts according to our invention, and have obtained reactivated catalysts capable of producing superior product yields in the hydroforming process, by depressuring the catalyst to atmospheric pressure or lower prior to initiating the reactivation procedure.

One object of our invention is to effect an improvement in the reforming of hydrocarbons. Another object is to effect an improvement in catalysts for the hydroforming of hydrocarbons. A further object is to effect an improvement in the hydroforming of hydrocarbons with platinum hydroforming catalysts under coke-forming conditions. A specific object is to provide a means for the reactivation of platinum-alumina hydroforming catalysts, and variants thereof. A further specific object is to reactivate deactivated platinum hydroforming catalysts more effectively and to permit their reuse in the hydroforming process. A subsidiary object is to minimize the build-up of carbon on supported platinum hydroforming catalysts. A further subsidiary object is to remove carbon from platinum hydroforming catalysts without damage to the catalytic centers present within such catalysts. A further subsidiary object is to remove from platinum the hydroforming catalysts any materials of unknown composition which tend to mask the active centers present therein. Another object is to increase the useful life of platinum hydroforming catalysts. Other objects of our invention and its advantages over the prior art will be apparent from the present description thereof and from the appended claims.

In our primary oxidation step, a deactivated and carbonized platinum-containing hydroforming catalyst containing in excess of 0.1 percent by weight of carbon is contacted with dilute oxygen while being maintained at a temperature above about 750° F. but not greatly above the recrystallization temperature (around 860° F.) of the catalytic metal, suitably above 750 and below 900° F., and preferably between about 825 and 850° F. The regenerating gas may be air, which is preferably diluted to some extent with flue gas or an inert gas such as nitrogen to an oxygen content between about 0.5 and 20 percent, preferably about 2 to 10 percent. We ordinarily employ an oxygen partial pressure between about 0.1 and 100 pounds per square inch, preferably between about 1 and 50 pounds per square inch, the higher oxygen partial pressures being employed at the lower temperatures and lower carbon contents. A contact time between about 0.2 and 5 hours is ordinarily sufficient to reduce the proportion of carbon to less than about 0.05 percent by weight and to produce an effective reconditioning of the catalyst. In fixed-bed reactors, we prefer to operate at a contact time between about 1 and 3 hours, whereas in fluidized-catalyst systems we prefer to operate at considerably shorter contact times, of the order of one minute or less up to one hour. The proportion of residual carbon varies somewhat according to the oxidation time and conditions and also according to the age of the catalyst. Fresh catalyst, for example, is readily oxidized to a carbon level around 0.01 percent, whereas during 1750 hours on stream in a cyclic hydroforming process employing our primary reactivation procedures at 20-hour intervals, we have found that the catalyst builds up and retains somewhat more than 0.05 percent by weight of refractory carbon. The oxygen-treated catalyst can be returned immediately to service in the hydroforming process, wherein it will automatically receive a hydrogen treatment effective to restore any oxidized platinum centers. Alternatively, the oxygen-treated catalyst can be subjected to an optional purge with an inert gas and thereafter to a treatment with a hydrogen-containing gas at a temperature within the hydroforming range, suitably 600 to 1000° F. and preferably 850 to 950° F., prior to being returned to use in the hydroforming process.

As indicated hereinabove, our process can optionally include a supplemental oxidation step, in which the treated catalyst from the primary oxidation step is further oxidized under more severe conditions to remove any residual or accumulated oxidizable carbon therefrom. The said supplemental oxidation can be effected by increasing the oxygen concentration in the treating gas or otherwise increasing the oxygen partial pressure, and/or by raising the temperature 10° F. or more, preferably 25° F. or more, above the primary oxidation level, suitably as high as 925° F. We prefer to use air as the regeneration gas in this step, optionally diluted with flue gas or inert gas to an oxygen content between about 10 and 20 percent. Substantially all of the oxidizable carbon is removed by this treatment, and the catalyst is ordinarily left with a carbonaceous residue of less than about 0.01 percent by weight. The treated catalyst is thereafter subjected to contact with hydrogen as set forth above.

The attached flowsheet illustrates an embodiment of our invention in a typical hydroforming process employing a fixed-bed reactor. A charging stock is vaporized in heater 11 and introduced through line 12 into the top of reactor 13. The charging stock is a conventional hydroforming feed, which may be a naphtha having a boiling range extending from 100 to 400° F. or even somewhat higher, owing to the reactivation feature of our process. Ordinarily a charging stock boiling within the range of about 200 to 380° F. is used. The reactor is packed with a pelleted platinum-alumina catalyst 14, preferably based on a Heard-type alumina gel, as described in Reissue Patent 22,196 (October 6, 1942). The catalyst is prepared by commingling with the said gel a suspension of platinum sulfide equivalent to about 0.1 to 2 percent by weight, preferably about 0.6 percent, of platinum, calculated on the basis of dry $Al_2O_3$, and thereafter drying, crushing, pelleting, drying, and calcining. Other catalysts may be employed as described herein, comprising other supporting materials and other forms of platinum, optionally with additional catalytic components. A recycle gas stream comprising essentially hydrogen is also introduced through heater 15 and line 16 into the top of reactor 13. The mixture of charging stock and recycle gas flows downward through the catalyst bed, where the hydroforming reactions are carried out at a temperature between about 800 and 1000° F., preferably between about 850 and 950° F., a pressure between about 50 and 500 pounds per square inch, preferably around 200 pounds per square inch, a hydrogen rate of 1000 to 10,000 standard cubic feet per barrel of charging stock, and an hourly weight space velocity of 0.5 to 5. The reaction products emerge from the bottom of the reactor through line 17 and cooler 18 to knockout drum 19, from which the liquid products are withdrawn through line 20 to a conventional distillation system (not illustrated) and the product gas is withdrawn through line 21. The product gas is essentially hydrogen, with small proportions of paraffins, olefins, hydrogen sulfide, carbon oxides, water, and other impurities.

The invention contemplates the two-stage oxidative treatment in combination with the additional steps of reducing any oxide formed on the catalyst during such oxidative treatment by passing hydrogen gas over the catalyst, and treating hydrogen recycle gases separated from the catalyst during the on-stream cycle to remove therefrom impurities such as water formed during the reducing step.

A portion of the gas may be vented through line 22 as required to hold the reactor pressure down to the desired level and to avoid any accumulation of impurities. The remainder is led through line 23 into the bottom of scrubber column 24, where it is washed with aqueous caustic, aqueous alkali, aqueous amines, or the like, introduced into the top of the scrubber through line 25, to remove carbon dioxide, hydrogen sulfide, and/or other acidic components of the gas stream. The exhausted scrubber solution emerges from the bottom of the scrubber through line 26, and is discarded or treated by conventional means to recover the components thereof and/or to regenerate the treating solution.

The purified recycle gases emerge from the top of scrubber 24 through lines 27 and 27a and are led into contactors 28 or 28a, where they are treated with activated carbon, silica gel, activated alumina, clay, molecular sieves, or other surface-active solid to remove water and olefinic hydrocarbons.

Alternatively the scrubbed gases may be contacted, prior to drying, with a liquid solvent for olefins, such as a high-boiling hydrocarbon, phenol, sulfuric acid, phosphoric acid, or the like, and the gases may thereafter be dried.

Referring to the drawing, a multiplicity of contactors 28 and 28a may be used to permit periodic reconditioning thereof. The contactors are operated to reduce the water content of the on-stream recycle hydrogen, e.g., from about 650 p.p.m., to about 5 to 10 p.p.m. As the effectiveness of the contactors diminishes, the dew point of the contacted recycle gas varies in the ranges of between about —30° F. to —50° F. at the beginning of a contactor cycle to between about —10° F. to —25° F. at the end of the cycle.

To reactivate a contactor 28 or 28a, a slip stream of wet recycle gas in line 35 may be heated in heater 36 to a temperature of about 450° F. and passed through the contactor. Alternatively, flue gas from line 33 may be supplied by line 33a to the heater 36. The valves on lines 27, 27a and lines 29, 29a are manipulated, as is well known in the art, so that contactors 28 and 28a may be alternately on-stream and alternately reactivated. The withdrawn reactivation gas, whether it be the slip stream or the flue gas, may be vented from the contactors via line 37 or recycled on the system as desired. Accordingly, when wet recycle gas is used as the reactivating gas for the dryer or contactor, the effluent from the particular contactor may be cooled and returned to the system.

The product recycle gas, now substantially free of significant impurities, emerges through line 29 and is recycled through compressor 30, heater 15, and line 16 to the top of reactor 13. Makeup hydrogen is added as required through line 31 to line 29.

To insure that the compressor 30 operates on relatively cool gas, a reactivated contactor is first cooled with reactivation gas that bypasses heater 36 through line 35a.

After 10 to 200 hours on stream, the catalyst in reactor 13 ordinarily becomes somewhat deactivated and accumulates carbon, for example in excess of 0.05 to 0.1 percent by weight of carbon. It is then subjected to reactivation according to our process. The flow of charging stock and recycle gas is stopped, the reactor is depressured through lines 17 and 32, and is purged of charging stock and hydrogen by means of flue gas or an inert gas introduced into the top of the reactor through line 33. A stream of air, diluted with flue gas or nitrogen to an oxygen content between about 2 and 10 percent, is then introduced at atmospheric or somewhat elevated pressure and a space velocity around 1,000 volumes per volume of catalyst-filled reactor space per hour into the top of the reactor through line 34. The dilute oxygen stream flows downward through the catalyst bed 14, which is maintained at a temperature above about 750 and below 900° F. by means of cooling tubes (not shown). Carbon is burned from the catalyst by this means, and is ordinarily reduced to a level below about 0.05 percent by weight in a treating time of about 1 to 3 hours. Flue gas leaves the bottom of the reactor through lines 17 and 32. The proportion of carbon dioxide in the flue gas is a convenient indication of the extent of reactivation.

When the proportion of carbon dioxide in the flue gas drops abruptly or reaches a level of around 0.1 percent, the primary reactivation is substantially complete. We then may optionally subject the catalyst to a secondary or supplemental reactivation under more severe conditions, as described hereinabove. In the supplemental reactivation, we ordinarily increase the oxygen content of the reactivating gas to a level between about 10 and 20 percent, raise the catalyst temperature at least 10° F., preferably about 25° F., to a level preferably between about 875 and 925° F., and subject the catalyst to the new conditions for an additional period of about 1 to 24 hours. After this treatment, the catalyst ordinarily contains less than about 0.01 percent by weight of carbon.

The catalyst is finally purged with flue gas introduced through line 33, the reactor is repressured with hydrogen or recycle gas, the catalyst is exposed to hydrogen or recycle gas at around 800 to 1000° F. for a period of 0.1 to 1 hour, and the hydroforming cycle is resumed; the catalyst being now restored to substantially its original levels of activity and selectivity and to its original capacity for maintaining its activity and selectivity.

While the attached flowsheet describes the application of our new process to the treatment of a fixed-bed catalyst, it will be apparent that the process is equally applicable to the regeneration of other forms of catalysts, employed in other types of catalytic apparatus. For example, the catalyst can be used in the form of a moving bed, in which the charging stock and catalyst are preferably passed in countercurrent flow, and the exhausted catalyst is withdrawn and regenerated according to our technique, preferably also in a moving bed. Alternatively, the catalyst can be used in the form of a fluidized powder. Other alternations and modifications will be apparent to those skilled in the art.

Our process is applicable broadly to the reactivation or revivification of carbonized hydroforming catalysts containing platinum as the essential component thereof. Such catalysts are generally supported upon a base consisting essentially of alumina, silica-alumina, or alumina plus a third component such as a fluoride, a chloride, boria, titania, chromia, an oxide of phosphorus, vanadia, or the like. The platinum is commonly employed in a proportion between about 0.1 and 2 percent by weight, based on the dry supporting material, preferably about 0.6 percent. Additional components, such as those of the group set forth above, are commonly employed in the proportion of about 0.1 to 10 percent by weight, based on dry $Al_2O_3$.

In the preparation of a typical hydroforming catalyst which, after being deactivated and carbonized during exposure to a hydrocarbon charging stock under hydroforming conditions, is capable of being regenerated according to our process, a mixture of platinum and alumina is prepared, and the mixture is dried and calcined. The alumina can be employed in any of a large variety of forms, such as alumina hydrosol, alumina hydrogel, alumina xerogel, alumina monohydrate, sintered alumina, and the like, all of which can be prepared according to methods described in the prior art. The alumina should preferably be in substantially pure form, and in particular should not include iron, manganese, nickel, cobalt, or compounds thereof. The alumina is commingled with platinum in the form of a platinum compound such as chloroplatinic acid, platinum tetrachloride, or the like, or a solution thereof, or preferably a stable colloidal suspension of a platinum sulfide. To this mixture may optionally be added a third component of the group set forth above, or a compound affording such a component. The mixture of catalyst components is optionally dried in part, suitably at a temperature between about 200 and 400° F. for a period between about 4 and 24 hours, and is then calcined at a temperature between about 800 and 1200° F. for around 2 to 8 hours or more. Alternatively, the catalytic mixture can be contacted with hydrogen or a hydrogen-containing gas at a temperature between about 300 and 600° F. for about 4 to 12 hours or more prior to the said calcining step, or the calcining step itself can be carried out in the presence of hydrogen or a hydrogen-containing gas. As a further alternative, the effect of the calcining treatment can be achieved during the utilization of the catalyst at elevated temperature and pressure in the hydroforming of hydrocarbons.

Hydroforming catalysts of the above type can be prepared in any of the various mechanical forms required by various types of hydroforming processes. Either before or after calcination, the catalyst can be broken into lumps or granules, or it can be ground into a fine powder, suitably for use in the suspensoid or fluidized-solids processes. Or it can be formed into pills, pellets, or other suitable shapes, preferably prior to the calcination step. In this case, the partially dried catalytic mixture is ground to a power, preferably small enough to pass through a 30-mesh screen, a suitable lubricant is added, such as stearic acid, rosin, hydrogenated coconut oil, graphite, or the like, and the mixture is shaped by extrusion, compression in a pilling machine, or otherwise according to methods well known in the art. Pills having dimensions ranging from about 1/8" x 1/8" to 1/2" x 1/2" are highly satisfactory for most purposes. The shaped masses can then be hydrogen-treated and/or calcined, as set forth above.

Our invention will be more fully understood from the following specific examples:

*Example I*

One kilogram of $AlCl_3.6H_2O$ was dissolved in 10 liters of distilled water, and the solution was adjusted to pH 8 by stirring and adding a sufficient quantity of aqueous 10 percent ammonium hydroxide. The resulting precipitate of aluminum hydroxide was filtered from the aqueous liquor, and was washed by slurrying six times in 6-liter portions of distilled water at 150° F. In each of the first five washes, 100 milliliters of aqueous 10 percent ammonium hydroxide were included in the wash water. The resulting salt-free solid was suspended in 3 liters of distilled water, and to the suspension were added 6.6 grams of aqueous 48 percent hydrofluoric acid which had been diluted with distilled water to a volume of 50 milliliters. A suspension of sulfided platinum was prepared by bubbling hydrogen sulfide for 4 minutes through 850 milliliters of aqueous $H_2PtCl_6$ solution containing 0.65 gram of Pt. This suspension was immediately commingled with the HF-alumina slurry. After being mixed for 15 minutes, the viscous slurry was placed in Pyrex dishes, dried at 180° F. for four hours, and further dried at 350° F. for 12 hours.

The cakes resulting from four such batches were mixed and ground to pass 30 mesh. The powder obtained thereby was mixed with 4 percent Sterotex (a hydrogenated coconut oil), formed into 1/4-inch pellets, and calcined in air at a final temperature of 900° F. for three hours. A sample of the completed pills was found to contain 0.27 percent platinum and 1.49 percent fluorine.

A portion of the completed catalyst was tested in the hydroforming of an El Dorado virgin naphtha having a boiling range of 190–375° F. and a CFR–R octane number of 35 at a pressure of 750 pounds per square inch, a liquid hourly space velocity of 4, and a recycle gas rate of about 5,000 cubic feet per barrel of charging stock, hydrogen being added as required to maintain the desired pressure. It was observed that the catalyst produced a $C_5$–400° F. gasoline having a 71.6 CFR–R octane number at 840° F.

After the catalyst had become carbonized and partly deactivated, the hydroforming cycle was stopped and the catalyst was reactivated. The charging stock, recycle gas, and fresh hydrogen flows were stopped, the reactor was depressured and swept with nitrogen, and the temperature was reduced to 800° F. Air diluted with nitrogen was then fed slowly into the reactor at 800 to 830° F. until the exothermic reaction slackened at the end of about 6 hours. Then the gas flow was changed to pure air, and the temperature was raised to 900° F., where it was held for about 3 hours. From the $CO_2$ content of the flue gas, it was calculated that the oxidation treatment removed carbon equivalent to 1.8 percent by weight of the catalyst. Finally, the reactor was purged successively with nitrogen and with hydrogen.

The unit was then repressured with hydrogen, the catalyst was cooled to 725° F. with hydrogen recycle, and the hydroforming cycle was resumed over a range of temperatures with recycle of the product gas. It was observed that the catalyst had been restored to its initial activity level, and produced a $C_5$–400° F. gasoline having a 71.6 CFR–R octane number at 840° F.

*Example II*

Four kilograms of $AlCl_3.6H_2O$ were dissolved in 25 liters of distilled water, and the resulting solution was adjusted to pH 8 by stirring and adding a sufficient quantity of aqueous 10 percent ammonium hydroxide. A precipitate of aluminum hydroxide was formed thereby, and was separated from the aqueous liquor by filtration. The precipitate was washed by slurrying six times in 21-liter portions of distilled water at 150° F. The resulting salt-free solid, containing 846 grams of $Al_2O_3$, was suspended in 11 liters of distilled water.

A suspension of platinum sulfide was prepared by adding 12 milliliters of aqueous ammonium polysulfide to 672 milliliters of an aqueous solution of platinum chloride containing 5.07 grams of platinum.

The platinum sulfide suspension was commingled with the alumina suspension, and the resulting mixture was dried over night at 185° F., then further dried at 350° F. The resulting cake was ground to pass 30 mesh, mixed with 4 percent "Sterotex" (a hydrogenated coconut oil), formed into 1/8-inch pellets, and calcined in air at 900° F. for about 4 hours. The completed catalyst contained 0.6 percent platinum, based on dry $Al_2O_3$.

A portion of the completed catalyst, when tested in the hydroforming of a Mid-Continent virgin naphtha at 200 pounds per square inch, a liquid hourly space velocity of 2, and a once-through hydrogen rate of about 5,000 cubic feet per barrel of feed, required a temperature of 880° F. to produce an 85-octane (CFR–R) $C_5$–400° F. gasoline, the gasoline being produced in 86.0 percent yield with a carbon deposition of 1.5 percent, based on the catalyst weight.

Another portion of the catalyst was subjected to a life test involving alternate exposure to charging stock under hydroforming conditions for twenty hours and subsequent regeneration by oxidation and hydrogenation. In the hydroforming stage, Mid-Continent virgin naphtha was contacted at 840 to 960° F., 200 pounds per square inch gage, 2 liquid hourly space velocity, and about 5,000 cubic feet of recycle gas per barrel of feed, the recycle gas being purified by passage through successive layers of soda-lime, Drierite, and charcoal. At the end of 20 hours on stream, the flow of charging stock and recycle gas was stopped, the reactor pressure was reduced to atmospheric, the reactor was purged with nitrogen, and the catalyst was contacted with a 2 percent mixture of oxygen in nitrogen at 850° F. until the $CO_2$ content of the flue gas fell below 0.1 percent. The reactor was again purged with nitrogen, the catalyst was reduced by contact with hydrogen for about three hours, and a new cycle of hydroforming and regeneration was then started.

After 253 hours on stream and 14 reactivations, the freshly reactivated catalyst produced a total $C_5$–400° F. product having a CFR–R octane number of 91.5 during the succeeding on-stream period.

*Example III*

A platinum-alumina catalyst, prepared as described in Example II, was tested in the hydroforming of a Mid-Continent virgin naphtha at 200 pounds per square inch, a liquid hourly space velocity of 2, and a recycle gas rate of around 5,000 standard cubic feet per barrel, the recycle gas being purified by passage through successive layers of soda-lime, Drierite, and charcoal, and containing around 80 percent of hydrogen. The CFR–R octane number of the $C_5$–400° F. gasoline product was maintained at 90 by gradually raising the average catalyst bed temperature from an initial level of 844° F. to a level of 873° F. at the end of 8 days. At this time, the yield broke away from the characteristic yield-octane curve and the deviation became progressively greater on the tenth and eleventh days, at which point the test was terminated.

The reactor was then depressured and flushed with nitrogen, and the catalyst was removed, sampled, and found to contain 8.7 percent by weight of carbon by assay.

The catalyst was replaced in the reactor and reactivated by contact with a 2 percent mixture of oxygen in nitrogen at 850° F. until the $CO_2$ content of the flue gas fell below 0.1 percent. The reactor was then purged with nitrogen, the catalyst was reduced by contact with hydrogen for about three hours, and the hydroforming cycle was resumed.

The sequence of hydroforming and reactivation steps, as set forth above, was continued for a time as a life test on the catalyst, the hydroforming step being discontinued in each case when the yield break-point was reached. In the fifth cycle, it was observed that the break-point came at six days, but that the yield-octane relationship was otherwise identical with that exhibited in the first cycle.

While we have described our invention with reference to certain specific embodiments thereof, it will be recognized that the said embodiments are illustrative only and not intended to be limitations on the scope of our invention. Our invention can, for example, be carried out in a multiplicity of steps, including an initial step or steps for the mild oxidation of the deactivated catalyst, and a subsequent step or steps for the further oxidation thereof under the more severe conditions defined hereinabove. Our invention is applicable broadly to the regeneration of plantinum-containing hydroforming catalysts, and it is to be understood that any modifications or equivalents that would ordinarily occur to one skilled in the art are to be considered as lying within the scope of our invention.

This application is a continuation-in-part of our co-pending application Serial No. 292,288, filed June 7, 1952, now abandoned.

What we claim is:

1. A low-pressure regenerative hydroforming process for treating a petroleum naphtha over a halogen-containing platinum-alumina catalyst and obtaining high-octane gasoline therefrom, wherein said catalyst is maintained at a high level of activity over a series of hydroforming and regeneration cycles, which process comprises contacting a petroleum naphtha with such catalyst in the presence of hydrogen at a temperature in the hydroforming range and a pressure of at least 50 pounds but less than about 500 pounds per square inch gage, withdrawing a liquid hydroformed naphtha stream and a product hydrogen gas stream, recycling the product hydrogen gas stream to the naphtha contacting zone containing such catalyst, continuing the hydroforming of said naphtha until the carbon content of the catalyst diminishes the catalytic properties of said catalyst, discontinuing said hydroforming operation, purging hydrocarbons from the catalyst, burning carbon from the catalyst at a temperature of between about 750 and 900° F. with a gas stream containing oxygen, contacting the oxygen-treated catalyst with a hydrogen-containing gas at a temperature within the hydroforming range, whereby oxides on said catalyst are reduced with the concomitant production of water, removing water from said hydrogen gas stream and recycling the resulting gas stream of reduced water content to the naphtha hydroforming zone wherein the hydroforming operation is resumed.

2. The method of claim 1 which includes the step of treating at least a part of the reducing gas stream with a surface active solid in the class consisting of silica gel, alumina and molecular sieves for effecting removal of water from said gas stream.

3. A low-pressure regenerative hydroforming process for treating a petroleum naphtha over an alumina-supported platinum catalyst and obtaining high-octane gasoline therefrom, wherein said catalyst is maintained at a high level of activity over a series of hydroforming and regeneration cycles, which process comprises contacting a petroleum naphtha with an alumina-supported catalyst containing between about 0.1 and 2 percent by weight of platinum, based on dry $Al_2O_3$, in the presence of hydrogen at a temperature in the range of about 800 to 1000° F. and a pressure of at least about 50 but less than about 500 pounds per square inch gage, withdrawing a liquid reformate stream and a product hydrogen gas stream, removing water and other impurities from said product hydrogen gas stream and recycling the resulting purified gas stream to the catalyst zone, discontinuing said hydroforming operation, purging hydrocarbons from the catalyst, burning carbon from the catalyst at a temperature of about 750 to 900° F. with a mixture of about .5 to 20 percent oxygen in flue gas under an oxygen partial pressure in the range of .1 to 100 p.s.i. whereby carbon removal is effected without damage to the active catalyst centers, thereafter treating said catalyst at a higher temperature between about 875 to 925° F. and at a higher oxygen partial pressure than employed in the carbon burning step, whereby additional carbon is removed therefrom, contacting the oxygen-treated catalyst with a hydrogen-containing gas at a temperature within the hydroforming range while resuming on-stream hydroforming operation, whereby oxides in said catalyst zone are reduced with the production of water, treating the recycle hydrogen gas during the on-stream hydroforming operation to remove water including that water which was formed by the reduction of the oxides.

4. A low-pressure regenerative hydroforming process for treating a petroleum naphtha over a halogen-containing platinum-alumina catalyst and obtaining high-octane gasoline therefrom, wherein said catalyst is maintained at a high level of activity over a series of hydroforming and regeneration cycles, which process comprises contacting a petroleum naphtha with an alumina-supported catalyst containing combined halogen and between about 0.1 and 2 percent by weight of platinum, based on dry $Al_2O_3$, in the presence of hydrogen at a temperature in the range of about 850 to 950° F. and a pressure of at least about 50 but less than about 500 pounds per square inch gage, withdrawing a liquid reformate stream and a product hydrogen gas stream, continuing the hydroforming operation until the carbon content of the catalyst exceeds about 0.1 percent by weight, then discontinuing said hydroforming operation, purging hydrocarbons from the catalyst, burning coke from the catalyst at a temperature of about 750 to 900° F. with a gas stream containing about 2 percent oxygen and having an oxygen partial pressure in the range of about .1 to 100 p.s.i. whereby coke removal is effected without damage to the active catalyst centers, thereafter soaking the treated catalyst for 1 to 24 hours at a higher temperature between about 875 and 925° F. at a higher oxygen partial pressure than employed in the coke burning step, whereby additional carbon is removed therefrom and oxides are produced, contacting the oxygen-treated catalyst with a hydrogen-containing gas at a temperature within the hydroforming range whereby oxides in said zone are reduced and water is produced, removing acidic components and water from said product hydrogen gas stream and recycling the resulting purified gas stream to the on-stream catalyst zone, and resuming the on-stream hydroforming operation.

5. A process for hydroforming naphtha and for reactivating a deactivated platinum-containing hydroforming catalyst containing carbon, said catalyst having become deactivated and carbonized during exposure to a naphtha charging stock under hydroforming conditions, which comprises contacting said catalyst with a gas mixture consisting essentially of an inert gas and between about 2 and 10 percent oxygen at a temperature above about 750 and below 900° F. for a sufficient time to reduce the proportion of carbon therein to less than 0.05 percent by weight, thereafter contacting said catalyst with a gas mixture consisting essentially of an inert gas and between about 10 and 20 percent oxygen at a temperature between about 875 and 925° F., whereby the proportion of carbon in said catalyst is further reduced, subsequently contacting said catalyst with a hydrogen-containing gas at a temperature within the hydroforming range whereby oxides on said catalyst are reduced and water produced, drying said hydrogen-containing gas, and again contacting said catalyst with said dried gas and naphtha under hydroforming conditions.

6. A method of maintaining a supported platinum hydroforming catalyst at high activity in a cyclic hydroforming operation at a pressure below 500 pounds per square inch gage, which method comprises contacting a naphtha charging stock with said catalyst in the presence of hydrogen at a temperature in the range of about 800 to 1000° F. under a pressure of at least 50 but less than 500 pounds per square inch gage, withdrawing a liquid reformate and a product gas stream, removing impurities from said gas stream, and recycling the resulting purified gas stream to said hydroforming process, continuing said operations until carbon accumulates on the catalyst, then depressuring said catalyst and purging hydrocarbons therefrom, contacting said catalyst with a gas mixture consisting essentially of an inert gas and a small percent of oxygen at a temperature above about 750 and below 900° F. for a sufficient time to reduce the proportion of carbon thereof, contacting said catalyst with a hydrogen-containing gas at a temperature within the hydroforming range, whereby oxides on said catalyst are reduced and water is produced, removing water from said hydrogen-containing gas, returning said catalyst to said hydroforming operation, and continuing to contact said dried gas with said catalyst.

References Cited in the file of this patent

UNITED STATES PATENTS

| | | |
|---|---|---|
| 2,406,112 | Schulze | Aug. 20, 1946 |
| 2,479,110 | Haensel | Aug. 16, 1949 |
| 2,641,582 | Haensel | June 9, 1953 |
| 2,642,383 | Berger et al. | June 16, 1953 |
| 2,664,404 | Blatz et al. | Dec. 29, 1953 |
| 2,758,064 | Haensel | Aug. 7, 1956 |

UNITED STATES PATENT OFFICE
CERTIFICATE OF CORRECTION

Patent No. 3,011,967                                  December 5, 1961

George E. Schmitkons et al.

It is hereby certified that error appears in the above numbered patent requiring correction and that the said Letters Patent should read as corrected below.

Column 1, line 18, for "molybdenum-alumina" read -- molybdena-alumina --; column 2, line 60, for "of", first occurrence, read -- by --; column 3, line 24, for "is" read -- in --; column 6, line 60, for "alternations" read alterations --; column 10, line 57, for "to" read -- and --.

Signed and sealed this 3rd day of July 1962.

(SEAL)
Attest:

ERNEST W. SWIDER
Attesting Officer

DAVID L. LADD
Commissioner of Patents